June 14, 1927.
S. L. JONES
1,632,081
SIGNALING DEVICE FOR AUTOMOBILES
Filed July 31, 1923   2 Sheets-Sheet 1
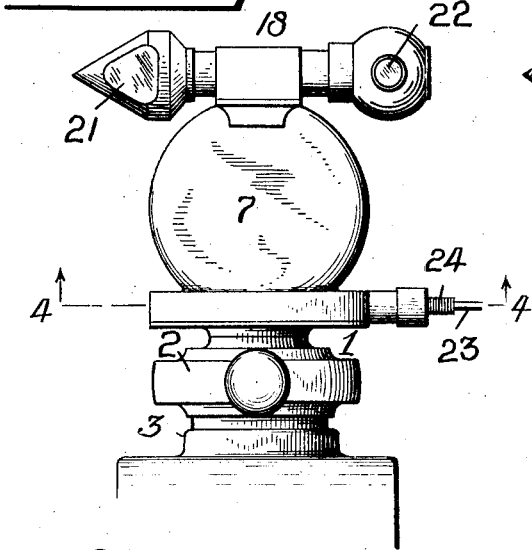
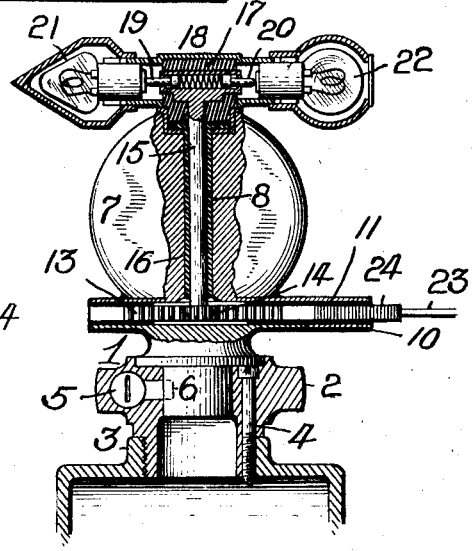
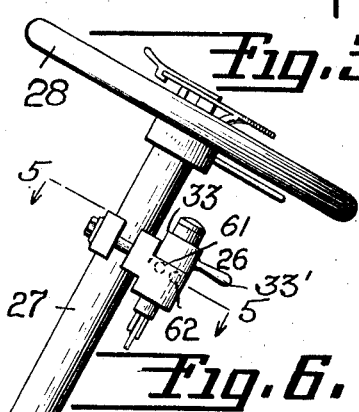
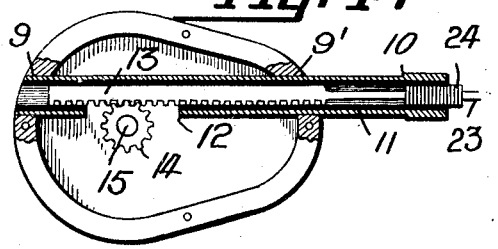
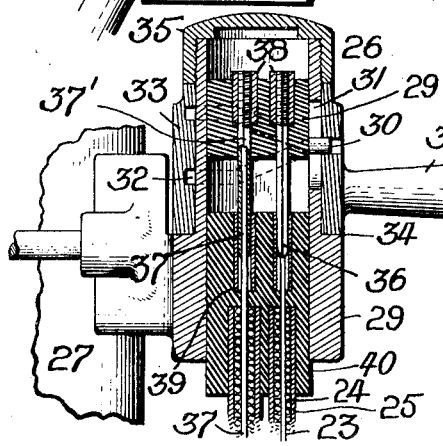
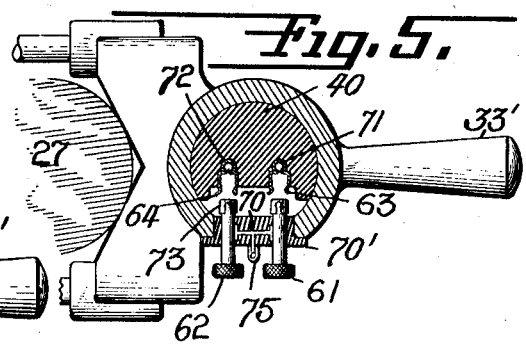
Inventor
Sheldon L. Jones.
By his Attorney
Herbert H. Thompson June 14, 1927.
S. L. JONES
1,632,081
SIGNALING DEVICE FOR AUTOMOBILES
Filed July 31, 1923      2 Sheets-Sheet 2
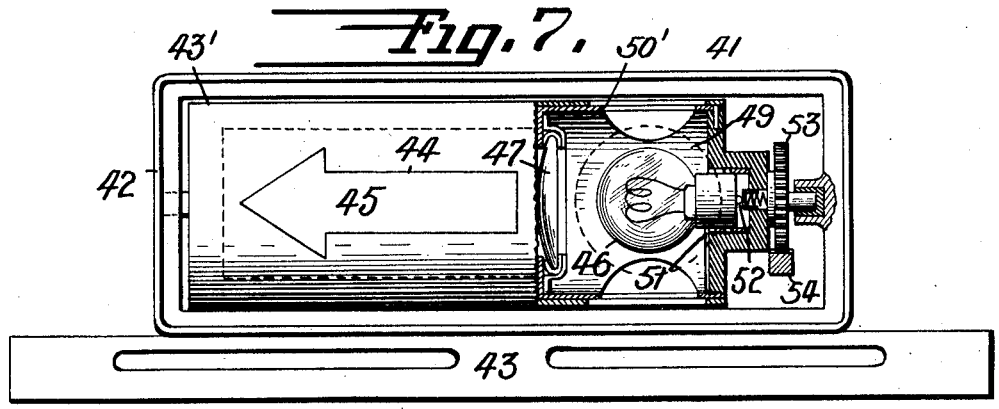
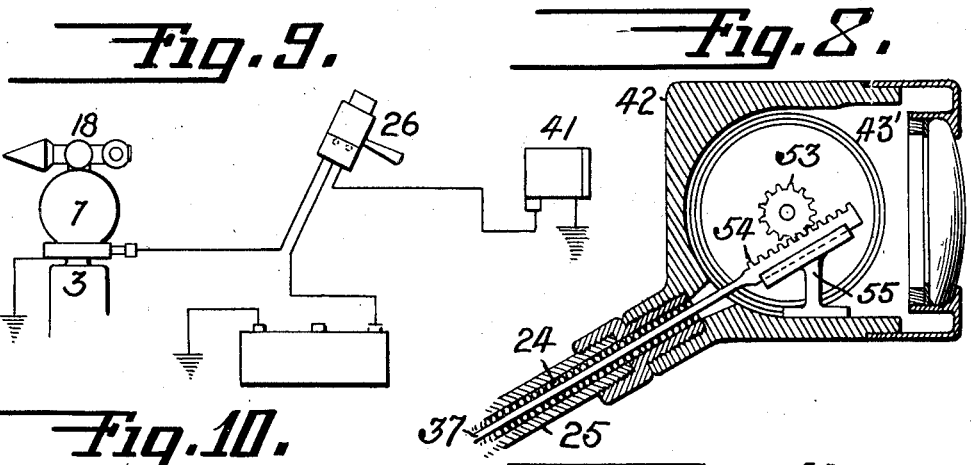
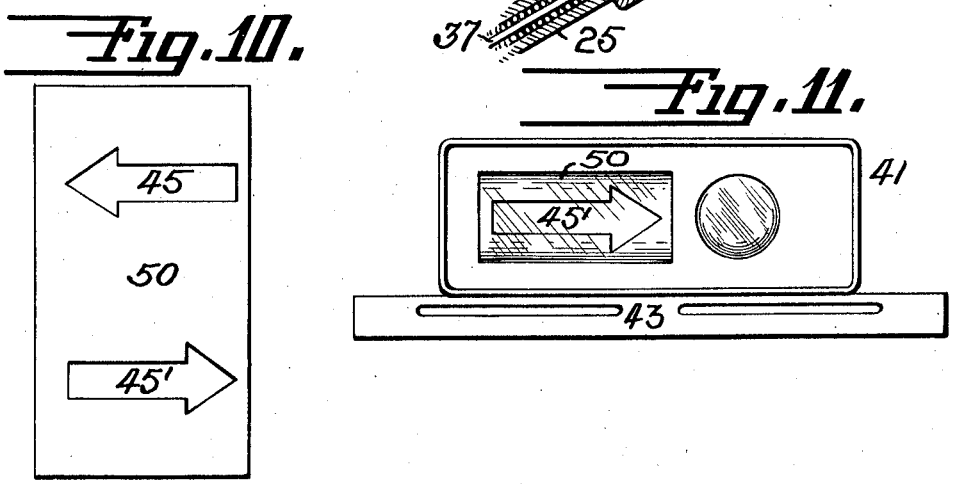
Inventor
Sheldon L. Jones.
By his Attorney
Herbert H. Thompson Patented June 14, 1927.

1,632,081

UNITED STATES PATENT OFFICE.

SHELDON LEE JONES, OF BROOKLYN, NEW YORK.

SIGNALING DEVICE FOR AUTOMOBILES.

Application filed July 31, 1923. Serial No. 654,838.

This invention relates to signaling devices adapted to be mounted on automotive vehicles for showing others in advance that the vehicle is about to turn and the direction of the turn.

The object of the invention is to simplify and improve upon indicators of this character, to construct and locate the indicator or preferably indicators so that an indication may be seen both from the front, sides and rear of the machine, and at the same time to render both indicators operable from a common point.

A further object of the invention is to eliminate special wiring for such indicators, so that no connections to wires need be made at the indicators, the forward one of which therefore may be mounted on the radiator cap itself.

Further objects of the invention will be apparent as the description proceeds.

Fig. 1 is a side elevation of the indicator for the forward portion of the automobile.

Fig. 2 is a similar view, partly in section, of the same indicator.

Fig. 3 is a side elevation of the steering column of an automobile showing my actuator mounted thereon.

Fig. 4 is a section on line 4—4 of Fig. 1.

Fig. 5 is a section on approximately broken line 5—5 of Fig. 3.

Fig. 6 is a vertical section through the actuator or operating mechanism.

Fig. 7 is a view with the side removed of the indicator for the rear portion of the automobile, the parts being shown in section.

Fig. 8 is a vertical section of the same.

Fig. 9 is an elementary wiring diagram of the electrical connection.

Fig. 10 is a development of the cylindrical portion of the rear indicator showing the location of the arrows.

Fig. 11 is a front elevation of the said indicator.

The indicator for the forward end of the car is shown as comprising a base 1 adapted to rest on or fit in the usual radiator filling cap 2 on the spout 3. To prevent theft of the device, I have shown a lock screw 4 for preventing removal of the cap and a plunger lock 5 for engaging a recess in the stem 6 of base 1 to lock the indicator to the cap. The base 1 has rising therefrom a central circular portion 7 vertically through which extends an aperture 8. There is also provided lateral openings 9, 9' (Fig. 4) in the base in which is secured a tube 10 or other guiding means. Said tube is preferably lined with insulating material 11 and is provided with a cut away portion 12. Within said tube is slidably mounted a rack bar 13, the teeth of which engage a pinion 14 on a vertical shaft 15 extending through aperture 8. Preferably said shaft is also insulated from the base by an insulating sleeve 16.

To said shaft is secured a block 17 around which is formed the rotatable indicator 18. Said block is shown as provided with projecting contacts 19 and 20 adapted to contact with the central contact on the bases of electric bulbs 21 and 22. Said bulbs are preferably of the single contact type, the outside of the base being grounded to the metal of the indicator. I have shown the indicator in the form of a spear, or rounded arrow, with a bulb at each end.

Connected to said rack bar 13 so as to move the same at will is a stout wire 23 preferably of the Bowden or encased type (see encasing coils 24, Figs. 2, 4, 6 and 8) so that both a pull and a push may be transmitted by means of a single wire. Said wire is intimately connected to said bar so as to make electrical contact, but is insulated as shown at 25 in Fig. 6 from the other metal parts of the car. Said wire 23 extends to an operating mechanism 26 adjacent the driver's seat and preferably located on the steering column 27, but not connected to the steering wheel 28, (Figs. 3 and 6).

As shown, said mechanism comprises a casing 29 adapted to be clamped on the steering column 27 in any suitable manner. Within said casing is slidably, but not rotatably mounted, a block 29' preferably composed of insulating material such as bakelite and having thereon a pin 30 extending through a slot 31 in the casing and engaging a spiral groove 32 on the inside of a rotatable sleeve 33. Said sleeve is shown loosely held between a collar 34 on said casing and a cap 35 threaded on the top of the casing and is provided with handle 33'. Within said block 29' is rigidly but adjustably held one or more slender tubes 36 and 37', which are split and threaded at their top and are designed to be slipped over wires 23 and 37. In assembling, the tubes are slipped over the ends of the wires, the wires adjusted to the proper length and then the tubes locked on the wires by threaded sleeves 38 which are then set in recesses in the bakelite. Said wires extend downwardly and are guided in sleeves 39 in a second, stationary block or plug 40 in the base of the casing. The wires 23 and 37 are here reduced in size, one of them extending to rack bar 13 on to indicator 18 and wire 37 extending preferably to the indicator 41 at the rear of the vehicle.

Preferably, also, I may provide adjacent the handle 33' one or more switches for lighting the lights in the indicators. As shown in Fig. 5, these switches may comprise a pair of push pins 61 and 62 extending through apertures in a metal plate 70 in a block of insulating material 70'. Said plate is connected to one side of the battery as by wire 75. Said pins are adapted to complete a circuit between a plate 70 and a pair of spaced spring terminals 63 and 64 formed integral with sleeves 71, 72 through which are slidable the respective wires 23, 37, so that when they (pins 61 and 62) are pressed inwardly beyond insulated caps 73, a circuit is completed and the lamp connected with the wire is lighted.

The indicator 41, while operating on a similar principle to indicator 18 preferably assumes quite a different appearance. As shown, it comprises a rectangular casing 42 adapted to be secured by a bracket 43 to the rear of the car and within which is mounted on a longitudinal axis a rotatable cylindrical member 43'. Said member has a transparent or translucent cylindrical portion 44 on which appears a pair of arrows 45 and 45', at say 180° apart; (see the development of Fig. 10). The cylinder normally stands with the blank 50 between the arrows so that a 90° turn in one direction will show one arrow and a 90° turn in the other direction the other arrow. In the compartment 49 to the right of the indicators is an electric bulb 46. A lens 47 may be provided to diffuse the light from the bulb within the cylinder. Also, the compartment 49 is cut away as at 50' to permit the bulb to be used as the tail lamp of the car, if desired. The bulb is shown as mounted in the usual single contact socket 51, contact being made with spring pressed button 52 in its base. Said button is electrically connected to gear 53 with which rack bar 54 meshes and contacts. Said bar is shown as slidably mounted on bracket 55 and merges into the second wire 37' mentioned above.

From the foregoing the operation of my invention will be obvious. When the driver is about to turn, he turns the handle, say in the direction of the turn, before he turns his steering wheel. This will simultaneously push or pull both wires 23 and 37 to rotate both indicators to show the direction of turn. As the turn is completed, or about to be completed, the driver turns the handle back to its central position, thus returning both indicators, indicator 18 to its straight position and indicator 41 to its blank position. If driving at night, either or both buttons 61, 62 are depressed to illuminate the indicators.

In accordance with the provisions of the patent statutes, I have herein described the principle of operation of my invention, together with the apparatus which I now consider to represent the best embodiment thereof, but I desire it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having herein described my invention, what I claim and desire to secure by Letters Patent is, 1. In a turning signal for automobiles, an indicator, means for rotatably mounting the same on the radiator cap, an electric bulb on said indicator, an operating member adapted to be mounted adjacent the driver's seat, an electric wire connecting said indicator and member and a flexible casing and insulation for said wire, whereby said wire is adapted to transmit both push and pull, an electric switch having one of its contacts on said wire, a source of electrical current, and an electrical connection between said source and said switch, and between said wire and said bulb, whereby said wire also serves to transmit current between said switch and bulb.

2. In a turning signal for automobiles, a base, a rotatable indicator, means for mounting the same thereon for turning about an axis including a conducting shaft, a single contact electric bulb for illuminating the same, a socket therefor electrically connected to the indicator, a conducting pinion on said shaft, a conducting rack bar slidably mounted in said base and engaging said pinion, means for insulating the bar and pinion from said base, and said shaft from the indicator and base, whereby said shaft serves as a connection from said pinion to said contact on the bulb, a wire connected to said bar for operating said bar from the driver's seat, and means for supplying current to said rack bar including said wire.

In testimony whereof I have affixed my signature.

SHELDON LEE JONES.